US012809002B2

(12) United States Patent
Otsuka

(10) Patent No.: US 12,809,002 B2
(45) Date of Patent: Nov. 24, 2026

(54) LIDAR DEVICE AND OPERATING METHOD THEREOF

(71) Applicant: Samsung Electronics Co., Ltd., Suwon-si (KR)

(72) Inventor: Tatsuhiro Otsuka, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 906 days.

(21) Appl. No.: 18/174,910

(22) Filed: Feb. 27, 2023

(65) Prior Publication Data

US 2024/0085537 A1 Mar. 14, 2024

(30) Foreign Application Priority Data

Sep. 14, 2022 (KR) ........................ 10-2022-0115807

(51) Int. Cl.

| | |
|---|---|
| ***G01S 7/48*** | (2006.01) |
| ***G01S 7/4865*** | (2020.01) |
| ***G01S 7/487*** | (2006.01) |
| *G01S 17/10* | (2020.01) |

(52) U.S. Cl.

CPC .......... *G01S 7/4873* (2013.01); *G01S 7/4865* (2013.01); *G01S 17/10* (2013.01)

(58) Field of Classification Search

None

See application file for complete search history.

(56) References Cited

U.S. PATENT DOCUMENTS

| | | | | |
|---|---|---|---|---|
| 5,969,667 | A * | 10/1999 | Farmer | G01S 7/038 342/194 |
| 11,467,267 | B1 * | 10/2022 | John | H03G 3/3084 |
| 2009/0262005 | A1 * | 10/2009 | McNeill | G01S 13/9029 342/28 |
| 2015/0263762 | A1 * | 9/2015 | Shen | H03M 13/353 348/148 |
| 2020/0072735 | A1 | 3/2020 | Hutchens et al. | |
| 2020/0256955 | A1 * | 8/2020 | Kapusta | G01S 7/4876 |
| 2020/0319295 | A1 * | 10/2020 | Longman | G01S 7/352 |
| 2020/0341147 | A1 | 10/2020 | Dussan et al. | |
| 2021/0063550 | A1 | 3/2021 | Ramakrishnan et al. | |
| 2022/0043114 | A1 | 2/2022 | Kuo et al. | |
| 2023/0168344 | A1 | 6/2023 | Zhou | |
| 2023/0213652 | A1 | 7/2023 | Otsuka et al. | |

FOREIGN PATENT DOCUMENTS

| | | | | |
|---|---|---|---|---|
| CN | 114341667 A | 4/2022 | | |
| KR | 20150119623 A | * 10/2015 | | G01F 23/284 |
| KR | 10-2023-0102817 A | 7/2023 | | |

* cited by examiner

*Primary Examiner* — Hovhannes Baghdasaryan

(74) *Attorney, Agent, or Firm* — Harness, Dickey & Pierce, P.L.C.

(57) ABSTRACT

A light detection and ranging (LiDAR) device includes a laser light irradiator configured to irradiate a pulsed laser light towards an object, a laser light receiver configured to detect a pulsed laser reflected light signal based on receiving the pulsed laser light reflected from the object, a signal analyzer configured to determine whether the pulsed laser reflected light signal is a low signal to noise ratio (SNR) signal based on comparing a level of the pulsed laser reflected light signal with a reference signal level, and a processor configured to, in response to a determination that the pulsed laser reflected light signal is the low SNR signal, adjust a dynamic range of an analog-to-digital converter (ADC) to sample the pulsed laser reflected light signal.

19 Claims, 11 Drawing Sheets

"WHEN SIGNAL IS NOT SATURATED"

"WHEN SIGNAL IS SATURATED"

LIDAR DEVICE AND OPERATING METHOD THEREOF

CROSS-REFERENCE TO RELATED APPLICATION

This application is based on and claims priority under 35 U.S.C. § 119 to Korean Patent Application No. 10-2022-0115807, filed on Sep. 14, 2022, in the Korean Intellectual Property Office, the disclosure of which is incorporated by reference herein in its entirety.

BACKGROUND

1. Field

The present inventive concepts relate to light detection and ranging (LiDAR) devices and operating methods thereof.

2. Description of the Related Art

A light detection and ranging (LiDAR) system is used in various fields, for example, aerospace, geology, 3-dimensional (3D) maps, vehicles, robots, and drones. A LiDAR device has a function of measuring a distance between an imaging device and a subject by using, as an operating principle, a time of flight (ToF) of light. In detail, the LiDAR device irradiates a laser light towards an object, receives the same through a sensor, and measures the ToF by using signal processing of a circuit. Then, the LiDAR device calculates a distance to the object based on the ToF, generates a depth image regarding the object by using the calculated distance for each location of the object, and applies the depth image to technical fields of various purposes.

SUMMARY

Some example embodiments provide a light detection and ranging (LiDAR) device and an operating method thereof.

Additional aspects will be set forth in part in the description which follows and, in part, will be apparent from the description, or may be learned by practice of the presented embodiments of the present inventive concepts.

According to some example embodiments of the present inventive concepts, a light detection and ranging (LiDAR) device may include a laser light irradiator configured to irradiate a pulsed laser light towards an object, a laser light receiver configured to detect a pulsed laser reflected light signal based on receiving the pulsed laser light reflected from the object, a signal analyzer configured to determine whether the pulsed laser reflected light signal is a low signal to noise ratio (SNR) signal based on comparing a level of the pulsed laser reflected light signal with a reference signal level, and a processor configured to, in response to a determination that the pulsed laser reflected light signal is the low SNR signal, adjust a dynamic range of an analog-to-digital converter (ADC) to sample the pulsed laser reflected light signal.

The processor may be further configured to, in response to the determination that the pulsed laser reflected light signal is the low SNR signal, adjust the dynamic range of the ADC such that the dynamic range is smaller than a reference dynamic range, to configure the ADC to detect a valid signal corresponding to the pulsed laser reflected light signal from the low SNR signal.

The adjusted dynamic range may be ¼ of the reference dynamic range of the ADC.

The ADC may be configured to perform signal sampling with a sampling rate of 4 times per second on the pulsed laser reflected light signal determined to be the low SNR signal.

The signal analyzer may be further configured to compare a level of a first pulse from among a plurality of pulses of the pulsed laser reflected light signal corresponding to a certain pixel with the reference signal level, and, in response to a determination that the level of the first pulse is lower than the reference signal level, determine that the pulsed laser reflected light signal corresponding to the certain pixel is the low SNR signal.

The ADC may be further configured to perform, in response to a determination that the pulsed laser reflected light signal corresponding to the certain pixel is the low SNR signal, signal sampling using the adjusted dynamic range from a second pulse from among the plurality of pulses.

The processor may be further configured to, in response to the determination that the pulsed laser reflected light signal is the low SNR signal, adjust the dynamic range of the ADC such that the dynamic range is smaller than a reference dynamic range, to configure the ADC to detect a valid signal corresponding to the pulsed laser reflected light signal from the low SNR signal, and, in response to a determination that the signal sampling using the adjusted dynamic range is completed for the plurality of pulses, restore the adjusted dynamic range to the reference dynamic range of the ADC.

The signal analyzer may include a first ADC configured to perform analog-to-digital conversion on the pulsed laser light irradiated from the laser light irradiator, and a second ADC configured to perform analog-to-digital conversion on the pulsed laser reflected light signal detected by the laser light receiver, wherein the first ADC and the second ADC may be each configured to perform analog-to-digital conversion for 2-channel signal sampling from a second pulse of the pulsed laser reflected light signal corresponding to a certain pixel.

The pulsed laser light may be irradiated and the pulsed laser reflected light signal may be detected in units of one pixel of an image of the object.

The processor may be further configured to calculate a distance to the object, based on a time of flight (ToF) from the LiDAR device to the object, the ToF being measured based on detecting the pulsed laser reflected light signal.

According to some example embodiments of the present inventive concepts, an operating method of a light detection and ranging (LiDAR) device, may include irradiating, by a laser light irradiator, a pulsed laser light towards an object, detecting, by a laser light receiver, a pulsed laser reflected light signal based on receiving the pulsed laser light reflected from the object, determining, by a signal analyzer, whether the pulsed laser reflected light signal is a low signal to noise ratio (SNR) signal based on comparing a level of the pulsed laser reflected light signal with a reference signal level, and adjusting, by a processor in response to a determination that the pulsed laser reflected light signal is the low SNR signal, a dynamic range of an analog-to-digital converter (ADC) to sample the pulsed laser reflected light signal.

The adjusting may include, in response to the determination that the pulsed laser reflected light signal is the low SNR signal, adjusting the dynamic range of the ADC such that the dynamic range is smaller than a reference dynamic range, to configure the ADC to detect a valid signal corresponding to the pulsed laser reflected light signal from the low SNR signal.

The adjusted dynamic range may be ¼ of the reference dynamic range of the ADC.

The ADC may be configured to perform signal sampling with a sampling rate of 4 times per second on the pulsed laser reflected light signal determined to be the low SNR signal.

The determining may include comparing a level of a first pulse from among a plurality of pulses of the pulsed laser reflected light signal corresponding to a certain pixel with the reference signal level, and, in response to a determination that the level of the first pulse is lower than the reference signal level, determining that the pulsed laser reflected light signal corresponding to the certain pixel is the low SNR signal.

The operating method may further include, in response to a determination that the pulsed laser reflected light signal corresponding to the certain pixel is the low SNR signal, performing, by the ADC, signal sampling using the adjusted dynamic range from a second pulse from among the plurality of pulses.

The operating method may further include, in response to the determination that the pulsed laser reflected light signal is the low SNR signal, adjusting the dynamic range of the ADC such that the dynamic range is smaller than a reference dynamic range, to configure the ADC to detect a valid signal corresponding to the pulsed laser reflected light signal from the low SNR signal, and, in response to a determination that the signal sampling using the adjusted dynamic range is completed for the plurality of pulses, restoring the adjusted dynamic range to the reference dynamic range.

The pulsed laser light may be irradiated and the pulsed laser reflected light signal may be detected in units of one pixel of an image of the object.

The operating method may further include calculating a distance to the object, based on a time of flight (ToF) from the LiDAR device to the object, the ToF being measured based on detecting the pulsed laser reflected light signal.

According to some example embodiments of the present inventive concepts, a non-transitory computer-readable recording medium has recorded thereon a program for executing, on a computer, the operating method.

BRIEF DESCRIPTION OF THE DRAWINGS

The above and other aspects, features, and advantages of certain embodiments of the present inventive concepts will be more apparent from the following description taken in conjunction with the accompanying drawings, in which.

DETAILED DESCRIPTION

Figure 1:
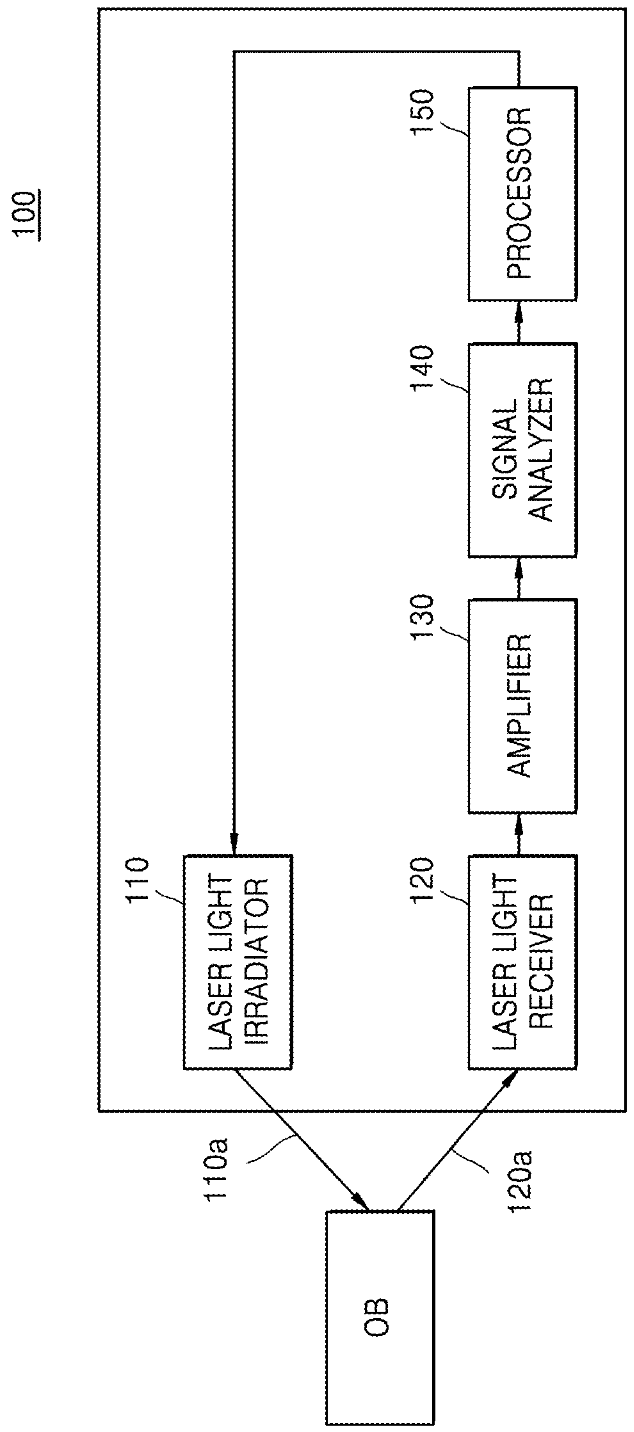
FIG. 1 is a diagram showing a light detection and ranging (LiDAR) device according to some example embodiments.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may have been arbitrarily selected, and in some example embodiments, the meaning of the selected terms will be described in detail in the detailed description of some example embodiments. Thus, the terms used herein have to be defined based on the meaning of the terms together with the description throughout the specification. In the drawings, like reference numerals refer to like elements, and the sizes of elements may be exaggerated for clarity of illustration. Some example embodiments described herein are for illustrative purposes only, and various modifications may be made therein.

In the description of some example embodiments, when a part is "connected" to another part, the part may not only be directly connected to the other part, but may also be electrically connected to the other part with another element in between. An expression used in the singular encompasses the expression in the plural, unless it has a clearly different meaning in the context. In addition, when a part "includes" a certain element, the part may further include another element instead of excluding the other element, unless otherwise stated.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

The terms such as "include", "comprise", and the like used in some example embodiments of the present inventive concepts should not be construed as necessarily including all of several components or operations described herein, but should be construed as not including some components or operations thereamong or as further including additional components or operations.

Further, the terms including ordinal numbers such as "first", "second", and the like used in the present specification may be used to describe various components, but the components should not be limited by the terms. The above terms may be used only to distinguish one component from another.

The description of the following example embodiments should not be construed as limiting the scope of rights, and features that are easily inferred by one of ordinary skill in the art should be construed as belonging to the scope of the example embodiments. Hereinafter, some example embodiments will be described in detail with reference to the accompanying drawings.

FIG. 1 is a diagram showing a light detection and ranging (LiDAR) device 100 according to some example embodiments.

The LiDAR device 100 may be used as a sensor for obtaining, in real time, 3-dimensional (3D) information, such as distance information, for an object OB in front and external to the LiDAR device 100. For example, the LiDAR device 100 may be applied to (e.g., included in) an unmanned vehicle, an autonomous vehicle (e.g., vehicle 2000 shown in FIG. 11), a robot, and/or a drone. For example, the LiDAR device 100 may be a device using LiDAR (e.g., smart phone 1500 shown in FIG. 10).

The LiDAR device 100 may include a laser light irradiator 110 (also referred to herein interchangeably as a laser beam irradiator), a laser light receiver 120 (also referred to herein interchangeably as a laser beam receiver), an amplifier 130, a signal analyzer 140, and a processor 150. The LiDAR device 100 shown in FIG. 1 include components related to some example embodiments of the present inventive concepts, but is not limited thereto, and it would be obvious to one of ordinary skill in the art that the LiDAR device 100 may further include general-purpose components other than the components shown in FIG. 1.

The laser light irradiator 110 may irradiate a pulsed laser light towards an object OB to analyze a location, shape, and distance of the object OB. The laser light irradiator 110 may generate and irradiate a pulsed light or a continuous light. Also, the laser light irradiator 110 may generate and irradiate light of a plurality of different wavelength bands.

For example, the laser light irradiator 110 may emit a light of an infrared spectrum. When the light of the infrared spectrum is used, the light may be prevented from being mixed with a natural light of a visible light spectrum, such as the light of the sun. However, the light is not necessarily limited to the infrared spectrum, and a light of various wavelength regions may be emitted. In some example embodiments, correction for removing information of a mixed natural light may be required.

The laser light irradiator 110 may irradiate (e.g., emit) a light (e.g., emit pulse laser light 110*a*) by using a laser light source, but is not limited thereto. Such irradiated light may be referred to as a light beam. The laser light irradiator 110 may use a light source, such as an edge emitting laser, a vertical-cavity surface emitting laser (VCSEL), a distributed feedback laser, or a super luminescent diode (SLD). For example, the laser light irradiator 110 may include a laser diode (LD). According to some example embodiments, the laser light irradiator 110 may be included in another apparatus and may not be necessarily configured as hardware included in the LiDAR device 100.

The laser light irradiator 110 may set an irradiation direction or irradiation angle of a light (e.g., pulsed laser light 110*a*) under control by the processor 150. Although not shown in FIG. 1, the laser light irradiator 110 may further include a beam steering device for changing the irradiation angle of the light. Here, the beam steering device may be implemented as a scanning mirror or an optical phased array.

The laser light receiver 120 may output an electric signal by (e.g., based on) detecting a pulsed laser light 110*a* reflected or scattered from the object OB as pulsed laser reflected light signal 120*a*, based on receiving the pulsed laser reflected light signal 120*a* reflected from the object OB. For example, the laser light receiver 120 may convert a light (pulsed laser reflected light signal 120*a*) reflected or scattered from the object OB based on reflection of the irradiated pulsed laser light 110*a* into a voltage signal. The irradiated pulsed laser light 110*a* may be referred to herein interchangeably as a pulsed laser light signal.

The laser light receiver 120 is a sensor for sensing a pulsed laser reflected light (e.g., pulsed laser reflected light signal 120*a*) and for example, may be a light-receiving device that generates an electric signal by light energy (e.g., based on energy of incident light). A type of the light-receiving device is not specifically limited. For example, the laser light receiver 120 may employ an avalanche photo diode (APD) or a single photon avalanche diode (SPAD). In other words, the laser light receiver 120 may use the light-receiving device, such as the APD or the SPAD, to receive the pulsed laser light reflected from the object OB and detect the pulsed laser reflected light signal.

The amplifier 130 may include a transimpedance amplifier (TIA). Also, the amplifier 130 may include a variable gain amplifier (VGA) for amplifying an electric signal using a variable gain that varies according to an amplified level of the electric signal provided from the TIA. In other words, the amplifier 130 amplifies the pulsed laser reflected light signal output from the laser light receiver 120.

The signal analyzer 140 may analyze a time of flight (ToF) of a laser light regarding the object OB (e.g., a ToF of the pulsed laser light 110*a* and the pulsed laser reflected light signal 120*a*) by performing signal processes on the pulsed laser reflected light signal obtained from the amplifier 130.

The signal analyzer 140 may include an analog-to-digital converter (ADC), a peak detector, a comparator, and a time-to-digital converter (TDC).

The ADC may perform analog-to-digital conversion on the pulsed laser reflected light signal by performing signal sampling on each of a plurality of pulses of the received pulsed laser reflected light signal.

The peak detector may detect a peak from the pulsed laser reflected light signal amplified by the amplifier 130. In detail, the peak detector may detect a peak by detecting a center location of the electric signal. Alternatively, the peak detector may detect a peak by detecting a width of the electric signal in an analog manner. Alternatively, the peak detector may detect a peak by converting the electric signal into a digital signal and then detecting a rising edge and a falling edge. Alternatively, the peak detector may detect a peak by using a constant fraction discriminator (CFD) method wherein the electric signal is divided into a plurality of signals, some of the plurality of signals are reversed and delayed and then combined with the remaining signals to detect a zero cross point. The comparator may output the detected peak as a pulse signal, and the TDC may output a digital value of the ToF by counting a time from when a laser light is irradiated to when the pulse signal indicating the peak is output.

The processor 150 may control general operations of various hardware/software components included in the LiDAR device 100.

The processor 150 may calculate a distance to a location of the object OB, based on the ToF measured by the signal analyzer 140, and perform data processing for analyzing the location and shape of the object OB. For example, the processor 150 may generate a depth image of the object OB, based on the calculated distance.

The ToF technology may include a technology for measuring a distance to an object by using a signal such as near-infrared rays, ultrasonic waves, or a laser (e.g., pulsed laser light). In detail, the ToF technology calculates a distance by measuring a time difference between when a signal is emitted (e.g., pulsed laser light 110*a* irradiated from the laser light irradiator 110) to an object OB and when the signal is reflected from the object OB (e.g., pulsed laser reflected light signal 120*a* received and detected at the laser light receiver 120). In the ToF technology, where a transmitter (e.g., a laser light irradiator 110) applies a signal (e.g., irradiates, emits, etc. pulsed laser light 110*a*) and a receiver receives a signal reflected from an object OB based on reflection of the applied signal (e.g., receives and detects pulsed laser reflected light signal 120*a*) to measure a total travel time of the signal (collectively light 110*a* and signal 120*a*), the transmitter (e.g., laser light irradiator 110) and the receiver e.g., laser light receiver 120) may be slightly spaced apart from each other in one device (e.g., LiDAR device 100). Also, since the signal from the transmitter may affect the receiver, a shielding film may be between the transmitter and the receiver.

The transmitter (e.g., laser light irradiator 110) may send an optical signal (e.g., pulsed laser light 110*a*) modulated at a specific frequency f, and the receiver (e.g., laser light receiver 120) may detect an optical signal reflected from an object OB (e.g., pulsed laser reflected light signal 120*a*). A phase change due to a time taken for the optical signal to travel to and from the object OB (e.g., total travel time of pulsed laser light 110*a* and pulsed laser reflected light signal 120*a* to and from the object OB) may be determined (e.g., by processor 150), and a distance to the object may be calculated as shown in Equation 1.

$$D=c/(2f)*(n+\theta/(2\pi)) \quad (1)$$

In Equation 1, D may be a distance of measurement, c may be a speed of light, f may be a frequency of an optical signal (e.g., frequency of at least the pulsed laser light 110*a*), n may be a constant when a phase cycle is repeated which may be stored at a memory of the LiDAR device 100, and θ may be a phase of the received optical signal which may be stored at a memory of the LiDAR device 100.

When a maximum value of the distance of measurement D is determined and the constant n is assumed to be 0, the distance of measurement D may be defined by using Equation 2.

$$D=c\theta/(4\pi f) \quad (2)$$

Information about (e.g., information associated with) the shape and location of the object OB analyzed by the processor 150 may be transmitted to another unit (e.g., device) to be used. For example, such information may be transmitted to an autonomous device, such as an autonomous vehicle or a drone, employing (e.g., including) the LiDAR device 100 (e.g., vehicle 2000 shown in FIG. 11), or to a computing device, such as a smart phone (e.g., smart phone 1500 shown in FIG. 10), a tablet computer, a laptop computer, a personal computer (PC), or a wearable device.

Meanwhile, when the object OB is close or a reflectance of the object OB is relatively high, a level (e.g., intensity, strength, etc.) of the pulsed laser reflected light signal 120*a* output from the laser light receiver 120 may be high. In some example embodiments, when the pulsed laser reflected light signal 120*a* of the high level is amplified using a same existing gain, a dynamic range of the electric signal may be exceeded, and thus the electric signal may be saturated.

In some example embodiments, when the object OB is far or the reflectance of the object OB is relatively low, the level of the pulsed laser reflected light signal received by the laser light receiver 120 is low, and thus a valid pulsed laser reflected light signal may not be detected or a signal of low signal-to-noise ratio (SNR) may be received. Even when the pulsed laser reflected light signal of a low SNR is amplified, noise is also amplified, and thus the SNR may not improve. Accordingly, reception of a low SNR signal may deteriorate a performance of the LiDAR device 100 of accurately measuring a distance, and thus may deteriorate performance of a device (e.g., vehicle) that utilizes data generated by the LiDAR device 100 (e.g., depth images).

The LiDAR device 100 may further include a memory storing programs and other pieces of data for operations performed by the processor 150. The memory is hardware storing various types of data processed by the LiDAR device 100, and for example, the memory may store data processed or to be processed by the LiDAR device 100. Also, the memory may store applications, drivers, and the like to be driven by the LiDAR device 100. The memory may include a random-access memory (RAM) such as a dynamic random-access memory (DRAM) or a static random-access memory (SRAM), a read-only memory (ROM), an electrically erasable programmable read-only memory (EEPROM), CD-ROM, Blu-ray or another optical disk storage, a hard disk drive (HDD), a solid-state drive (SSD), or a flash memory, and in addition, may include an external storage device that may access the LiDAR device 100.

The LiDAR device 100 and/or any portions thereof, including the laser light irradiator 110, the laser light receiver 120, the amplifier 130, the signal analyzer 140, the processor 150, or any portions thereof, may be included in, include, and/or implement one or more instances of processing circuitry such as hardware including logic circuits, a hardware/software combination such as a processor executing software; or a combination thereof. In some example embodiments, said one or more instances of processing circuitry may include, but are not limited to, a central processing unit (CPU), an application processor (AP), an arithmetic logic unit (ALU), a graphic processing unit (GPU), a digital signal processor, a microcomputer, a field programmable gate array (FPGA), a System-on-Chip (SoC) a programmable logic unit, a microprocessor, or an application-specific integrated circuit (ASIC), etc. In some example embodiments, the LiDAR device 100 and/or any portions thereof included in any of the example embodiments as described herein, including the processing circuitry included in and/or implemented by the LiDAR device 100 and/or any portions thereof, may include a non-transitory computer readable storage device, for example a solid state drive (SSD), storing a program of instructions, and the one or more instances of processing circuitry may be configured to execute the program of instructions to implement the functionality of some or all of any of the LiDAR device 100, the laser light irradiator 110, the laser light receiver 120, the amplifier 130, the signal analyzer 140, the processor 150, any portions thereof, or the like according to any of the example embodiments as described herein. It will be further understood that the processing circuitry may be configured to perform any of the methods, operations, functionality, or the like as described herein, for example based on including include a non-transitory computer readable storage device, for example a solid state drive (SSD), storing a program of instructions, and a processor (e.g., CPU) configured to execute the program of instructions to implement any or all of the operations of any of the methods according to any of the example embodiments, including without limitation any or all of the operations of the method shown in FIG. 9.

In the LiDAR device 100 according to some example embodiments, two or more of the laser light irradiator 110, the laser light receiver 120, the amplifier 130, the signal analyzer 140, or the processor 150 may be integrated together in a bulk-silicon substrate.

Figure 2:
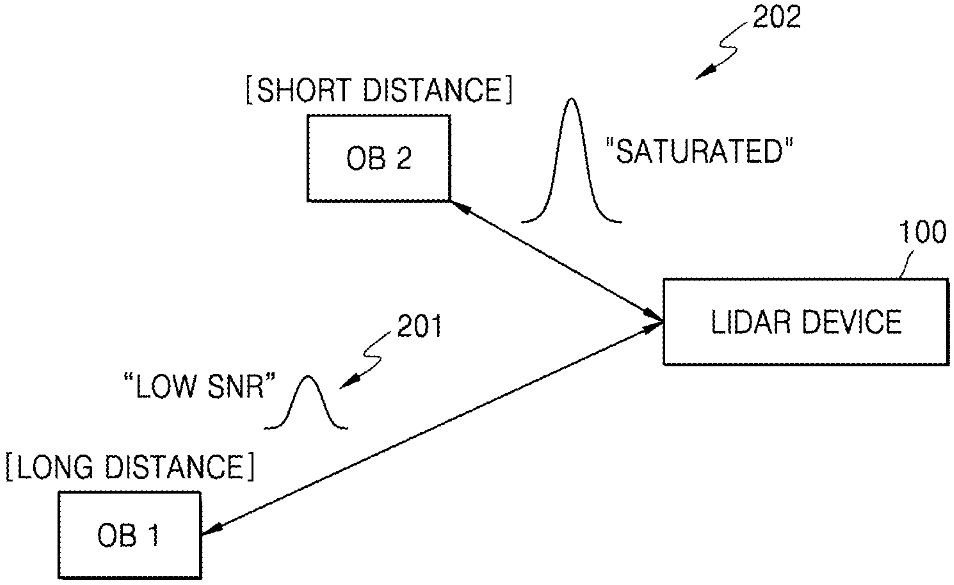
FIG. 2 is a diagram for describing a detection state of a pulsed laser reflected light signal according to a distance of an object according to some example embodiments.

FIG. 2 is a diagram for describing a detection state of a pulsed laser reflected light signal according to a distance of an object from a LiDAR device 100 according to some example embodiments.

Referring to FIG. 2, the LiDAR device 100 may measure a distance of each of an object OB1 at a remote distance and an object OB2 at a short distance by using a laser light. As described herein, a "distance", for example a "distance of" an object may be understood to refer to a distance of the object from the LiDAR device 100, a distance from the LiDAR device 100 to the object, or the like.

In detail, the LiDAR device 100 may calculate the distance based on a ToF from when the laser light is irradiated to the object OB1 at the remote distance to when a pulsed laser reflected light signal 201 is detected from the object OB1. Similarly, the LiDAR device 100 may calculate the distance based on a ToF from when the laser light is irradiated to the object OB2 at the short distance to when a pulsed laser reflected light signal 202 is detected from the object OB2.

Here, strength (e.g., intensity) of the pulsed laser reflected light signal 202 reflected from the object OB2 at the short distance may be relatively great. This is because when strengths (e.g., respective intensities) of laser lights (e.g., light beams, light signals, etc.) irradiated from the LiDAR device 100 are the same, a loss is decreased when a flight path of a laser light is decreased. Accordingly, when the LiDAR device 100 measures the distances by irradiating the laser lights of same strength to the object OB1 at the remote distance and the object OB2 at the short distance, the pulsed laser reflected light signal 202 reflected from the object OB2 at the short distance (e.g., the intensity thereof) exceeds a dynamic range detectable by the LiDAR device 100 and is detected as a saturated signal, and thus an accurate distance of the object OB2 may not be measured.

In some example embodiments, strength of the pulsed laser reflected light signal 201 reflected from the object OB1 at the remote distance may be relatively small. This is because a loss is increased when a flight path of a laser light is increased, and noise is also accompanied. When the object OB1 is at the remote distance or has a low reflectance, the signal analyzer 140 of FIG. 1 of the LiDAR device 100 may be unable to detect a pulse signal corresponding to the distance to the object OB1 at the remote distance. Accordingly, the LiDAR device 100 that may be configured to calculate the distance based on the ToF may be unable to accurately measure pulses of the pulsed laser reflected light signal 201 reflected from the object OB1 at the remote distance, and thus accuracy of distance measurement may deteriorate.

Figure 3:
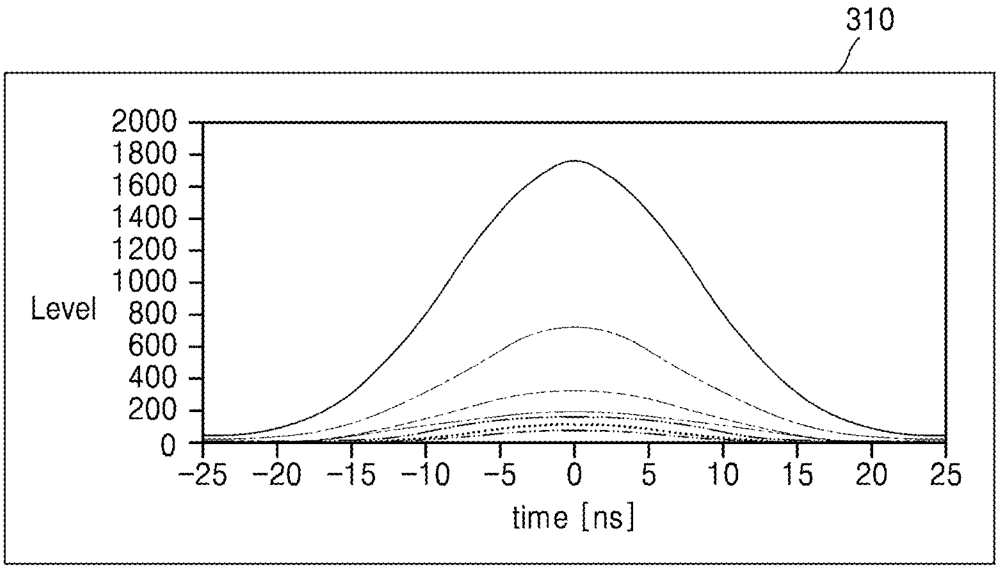
FIG. 3 is a diagram for comparing and describing an unsaturated signal and a saturated signal, according to some example embodiments.
Figure 3:
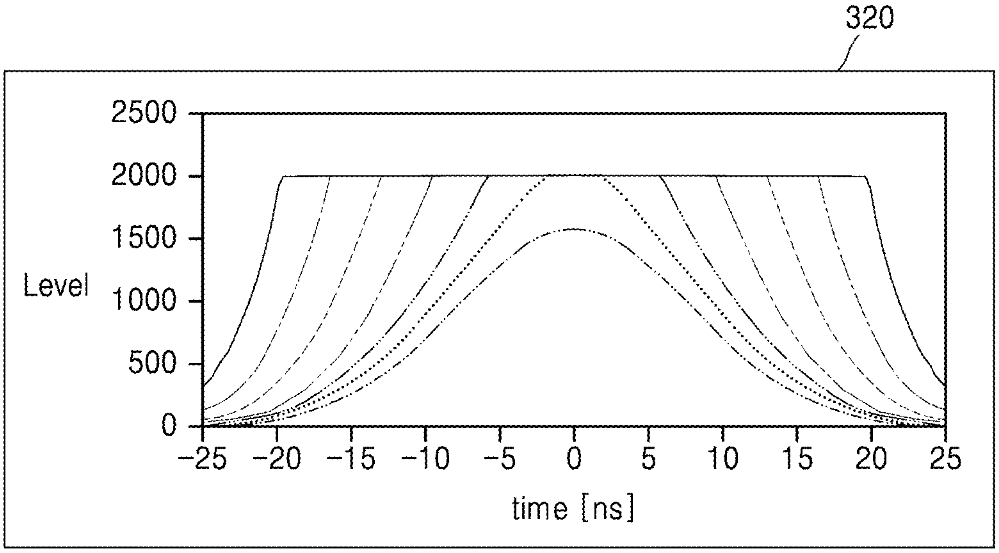

FIG. 3 is a diagram for comparing and describing an unsaturated signal and a saturated signal, according to some example embodiments.

Referring to FIG. 3, graphs 310 and 320 show laser reflected light signals obtained from objects at various distances.

A dynamic range of an envelope signal detectable by the LiDAR device 100 may be determined or may vary depending on the specification or configuration of the laser light receiver 120. The graph 310 shows pulsed laser reflected light signals obtained from objects at remote distances and shows a case where signals are not saturated. In some example embodiments, the graph 320 shows laser reflected light signals obtained from objects at short distances and shows a case where signals are saturated.

Referring to the graph 320, amplitudes of all signals are not measured for signals exceeding a level (e.g., magnitude, intensity, strength, etc.) of 2,000, and thus peaks of the corresponding signals are not detected. In other words, the LiDAR device 100 is unable to detect a peak of the pulsed laser reflected light signal and thus unable to accurately measure a distance to the object at the short distance. Accordingly, an error may occur in distance measurement or an SNR of the distance measurement may increase.

Figure 4:
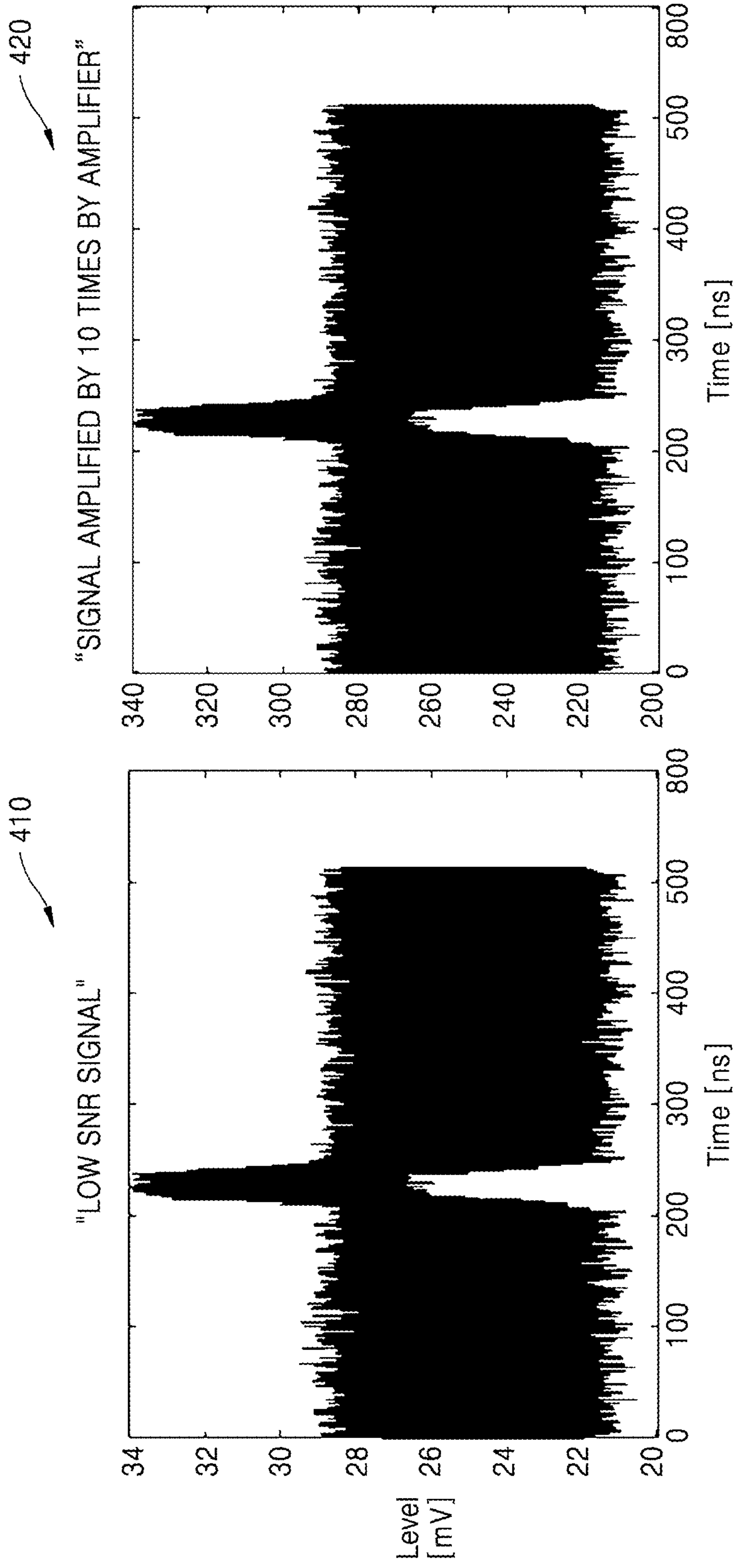
FIG. 4 is a diagram for describing a pulsed laser reflected light signal of a low signal to noise ratio (SNR), which is reflected from an object at a remote distance or an object of a low reflectance, according to some example embodiments.

FIG. 4 is a diagram for describing a pulsed laser reflected light signal of a low SNR, which is reflected from an object at a remote distance or an object of a low reflectance, according to some example embodiments.

Referring to FIG. 4, a graph 410 shows a level (e.g., magnitude, intensity, strength, etc.) of the detected (e.g., detected at the laser light receiver 120 of the LiDAR device 100) pulsed laser reflected light signal of the low SNR, which is reflected from the object at the remote distance or the object of the low remote distance. A low SNR signal may include valid distance information of an object and noise together. However, as in a graph 420, when the low SNR signal is amplified (e.g., by amplifier 130) by 10 times to extract the valid distance information of the object, a noise signal is also amplified together with a signal of the valid distance information, and thus even when a signal is amplified from the low SNR signal, it may be difficult to obtain only the valid distance information from the amplified signal.

Accordingly, in some example embodiments of the present inventive concepts, a method of varying a dynamic range of the ADC of the signal analyzer 140 is used so as to detect a valid signal from an object at a remote distance or an object of a low reflectance.

Figure 5:
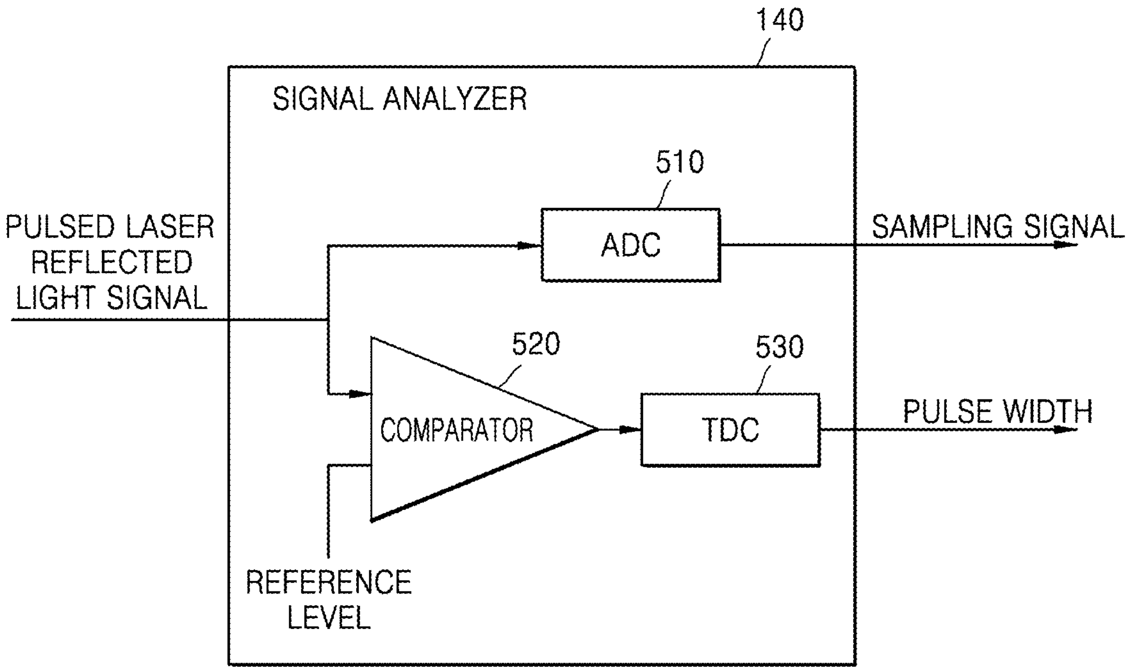
FIG. 5 is a diagram for describing an operation of a signal analyzer of a LiDAR device, according to some example embodiments.

FIG. 5 is a diagram for describing an operation of the signal analyzer 140 of the LiDAR device 100, according to some example embodiments.

Referring to FIG. 5, the signal analyzer 140 may include an ADC 510, a comparator 520, and a TDC 530. The signal analyzer 140 shown in FIG. 5 includes components related to the description of some example embodiments, and the signal analyzer 140 may further include other general-purpose components.

The ADC 510 may perform analog-to-digital conversion on a pulsed laser reflected light signal by performing signal sampling on each of a plurality of pulses of the received pulsed laser reflected light signal. In detail, the ADC 510 samples an analog pulse signal to a digital signal by using a voltage level of a pre-set dynamic range. The digital signals may be added and thus a signal strength value corresponding to each pixel of an object image may be output.

The comparator 520 obtains a pulsed laser reflected light signal and compares the pulsed laser reflected light signal with a pre-set reference level (e.g., reference signal level), which may be stored at the LiDAR device 100, for example at a memory thereof, at the comparator 520, etc. A "level" of a signal, for example of a pulsed laser reflected light signal, may refer to a magnitude, intensity, strength, etc. of the signal. The pulsed laser reflected light signal input to the comparator 520 may be a signal amplified by the amplifier 130. The comparator 520 may use the reference level (also referred to herein as the reference signal level) to detect a section where an electric signal is saturated or too low (or dissipated). The comparator 520 may compare the reference level and a level of the pulsed laser reflected light signal, and output a certain signal value in a section where the pulsed laser reflected light signal is higher or lower than the reference level. For example, the certain signal value may be a pulse signal indicating high or a digital signal indicating a certain logic value (for example, a logic value "1"), but is not limited thereto. In other words, any type of output may be applied to some example embodiments of the present inventive concepts as long as the comparator 520 provides an output for indicating a result of comparing the pulsed laser reflected light signal and the reference level. For example, the comparator 520 may be configured to determine whether the pulsed laser reflected light signal is a low signal to noise ratio (SNR) signal based on comparing a level of the pulsed laser reflected light signal with the reference signal level. For example, in response to a determination that the level of the pulsed laser reflected light signal is greater than the reference signal level, the comparator 520 may determine that the pulsed laser reflected light signal is a high SNR signal and output a pulse signal indicating a certain logic value (e.g., a logic value "1") indicating that the pulsed laser reflected light signal is a high SNR signal. In another example, in response to a determination that the level of the pulsed laser reflected light signal is smaller than the reference signal level, the comparator 520 may determine that the pulsed laser reflected light signal is a low SNR signal and output a pulse signal indicating a certain logic value (e.g., a logic value "0") indicating that the pulsed laser reflected light signal is a low SNR signal.

The TDC 530 may measure a pulse width of the pulsed laser reflected light signal by counting a time during which the signal value output from the comparator 520 is maintained. For example, the TDC 530 may output a digital value corresponding to the measured pulse width.

In other words, the signal analyzer 140 outputs a digital signal (a sampling signal or a pulse width) corresponding to the pulsed laser reflected light signal.

Figure 6:
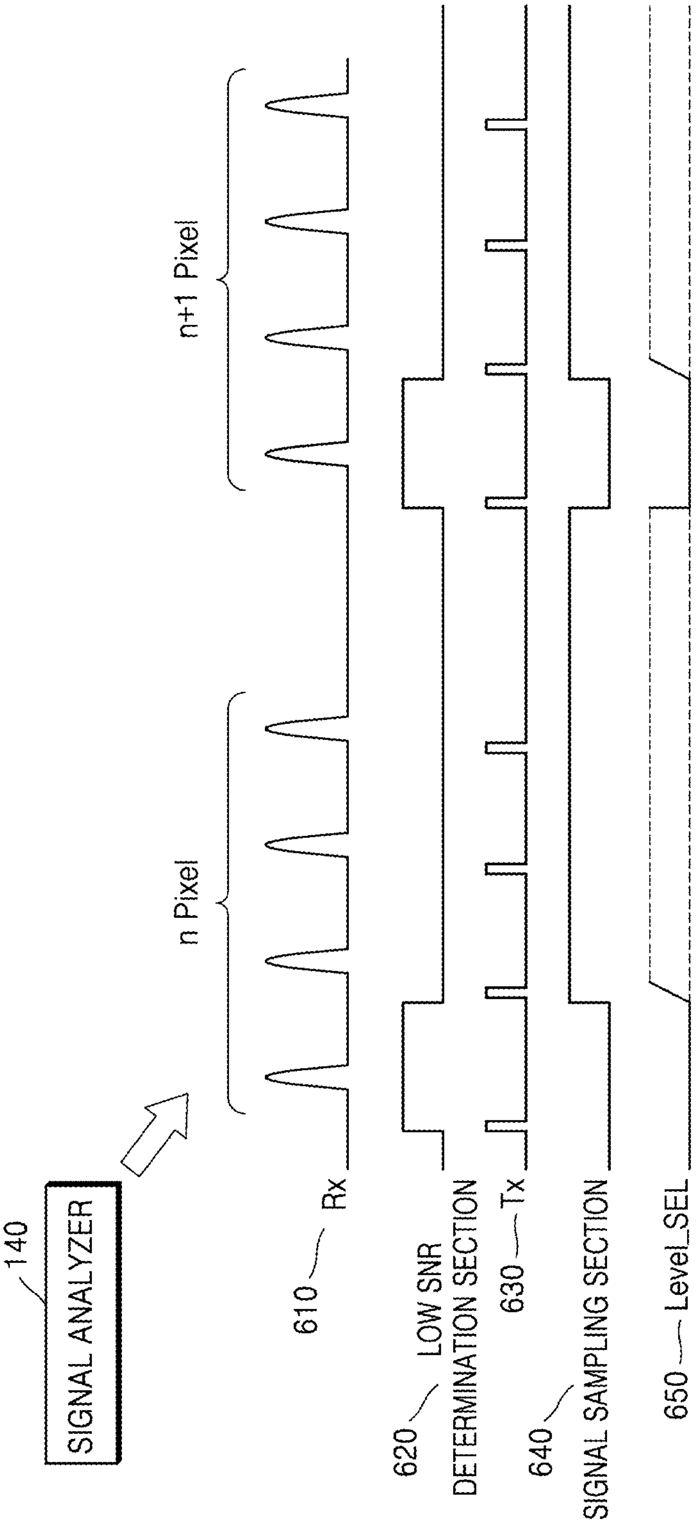
FIG. 6 is a diagram for describing a method by which a signal analyzer operates regarding a low SNR signal, according to some example embodiments.

FIG. 6 is a diagram for describing a method by which the signal analyzer 140 operates regarding a low SNR signal, according to some example embodiments.

Referring to FIG. 6, the signal analyzer 140 may determine whether a pulsed laser reflected light signal is a low SNR signal by comparing a level of the pulsed laser reflected light signal with a reference signal level, where the reference signal level may be a fixed value stored at the LiDAR device 100, for example at a memory thereof. Here, the reference signal level for comparison may be set as any value suitable to an environment for using the LiDAR device 100.

Referring to a transmission (Tx) timing 630, the laser light irradiator 110 of FIG. 1 may irradiate a pulsed laser light 110*a* of a plurality of pulses towards a certain pixel (for example, an n pixel) of an object to measure a distance to the certain pixel (n pixel).

When (e.g., in response to) a certain period of time elapses according to the distance to the object after each pulse of the pulsed laser light is irradiated, the laser light receiver 120 of FIG. 1 may receive each pulse of pulses of a pulsed laser reflected light signal 120*a* as shown in a reception (Rx) timing 610. Here, the pulsed laser light 110*a* may be irradiated and the pulsed laser reflected light signal 120*a* may be detected in units of one pixel of an image of the object, but example embodiments are not limited thereto.

The signal analyzer 140 compares a level (e.g., magnitude, strength, intensity, etc.) of a first pulse from among the plurality of pulses of the pulsed laser reflected light signal corresponding to the certain pixel (n pixel) with the reference signal level so as to determine whether the pulsed laser reflected light signal for the certain pixel (n pixel) is a low SNR signal. In other words, a timing for determining a low SNR signal corresponds to a low SNR determination section 620. Here, to determine the low SNR signal, the signal analyzer 140 may compare a signal level (a digital value) obtained through analog-to-digital conversion using the ADC 510 of FIG. 5 of the signal analyzer 140 with the reference signal level or compare an analog voltage level using the comparator 520 of FIG. 5 of the signal analyzer 140 with the reference signal level.

When it is determined (e.g., in response to a determination) that the level of the first pulse is lower than the reference signal level, the signal analyzer 140 determines that the pulsed laser reflected light signal corresponding to the certain pixel (n pixel) is a low SNR signal.

When it is determined (e.g., in response to a determination) that the pulsed laser reflected light signal is the low SNR signal, the processor 150 of FIG. 1 adjusts a dynamic range of the ADC 510 of the signal analyzer 140 for sampling (e.g., to sample) the pulsed laser reflected light signal. For example, the processor 150 may provide, to the signal analyzer 140, a Level_SEL signal 650 for adjusting the dynamic range (e.g., to cause the dynamic range to be adjusted).

In detail, the processor 150 may, when it is determined (e.g., in response to a determination) that the pulsed laser reflected light signal is the low SNR signal, adjust the dynamic range of the ADC 510 such that the dynamic range is less (e.g., smaller) than a reference dynamic range, so as to detect a valid signal corresponding to the pulsed laser reflected light signal from the low SNR signal (e.g., to configure the ADS to detect a valid signal corresponding to the pulsed laser reflected light signal from the low SNR signal). Here, the reference dynamic range of the ADC 510 may be an initially set dynamic range of the ADC 510 and the adjusted dynamic range may be ¼ of the reference dynamic range of the ADC 510.

As the dynamic range of the ADC 510 is adjusted (reduced), the ADC 510 may perform signal sampling on the pulsed laser reflected light signal determined to be the low SNR signal in 4 times resolution (e.g., 4 times the normal resolution), and accordingly, further accurate valid distance information may be obtained from the pulsed laser reflected light signal of a low SNR.

When (e.g., in response to) the dynamic range of the ADC 510 is reduced in response to identifying the low SNR signal from the first pulse of the pulsed laser reflected light signal, the ADC 510 performs signal sampling by using the reduced (adjusted) dynamic range from a second pulse from among the plurality of pulses corresponding to the certain pixel (n pixel). This corresponds to a timing 640 of a signal sampling section.

When the signal sampling using the reduced (adjusted) dynamic range is completed for the plurality of pulses of the certain pixel (n pixel), the processor 150 restores the reduced (adjusted) dynamic range to the reference dynamic range. In other words, the processor 150 determines whether to vary the dynamic range by newly determining a low SNR signal again for another pixel (for example, an n+1 pixel).

Figure 11:
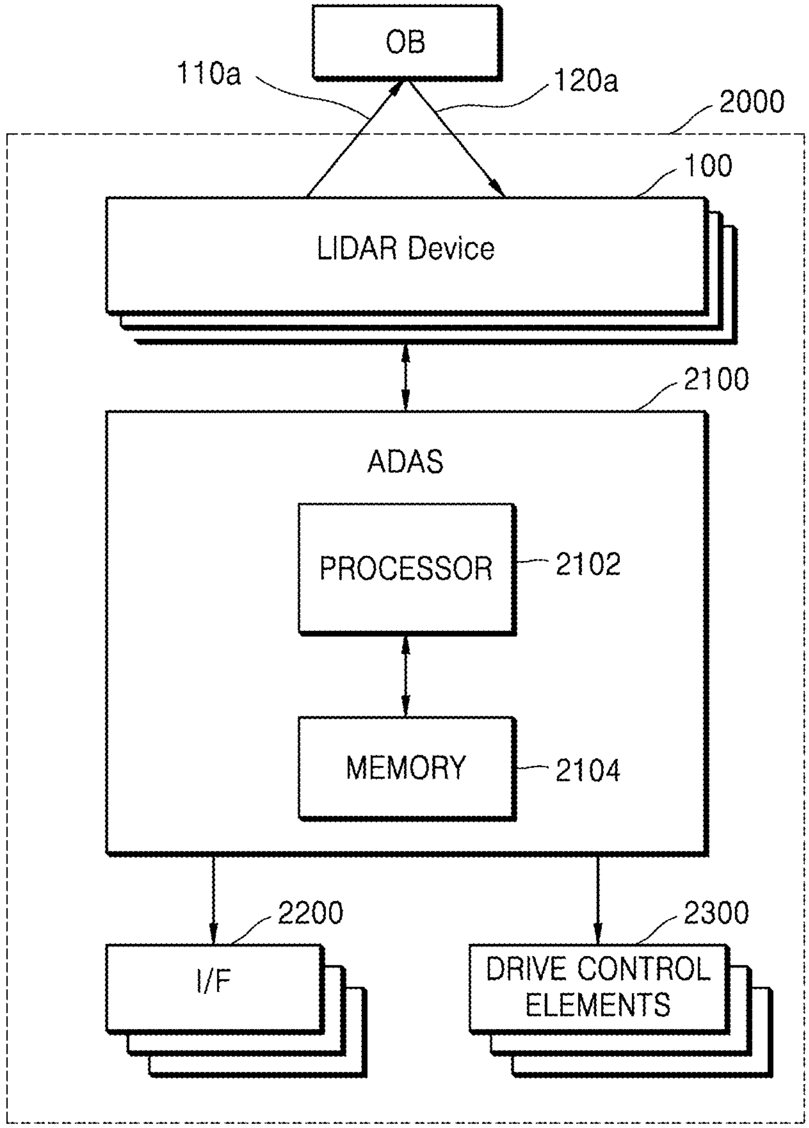
FIG. 11 is a block diagram illustrating a vehicle including a LiDAR device according to some example embodiments.

As such, the dynamic range of the ADC 510 adaptively changes for a low SNR signal reflected from an object at a remote distance or of a low reflectance (e.g., the LiDAR device 100 may be configured to adaptively change the dynamic range of the ADC 510 thereof to account for a low SNR signal reflected from an object OB at a remote distance or of a low reflectance), and thus the LiDAR device 100 may be configured to more accurately measure distance information for objects (or portions of an object) at various distances, such that the LiDAR device 100 may have improved operational performance and thus may enable improved performance (e.g., improved accuracy, safety of operation, etc.) of devices and/or systems that utilize outputs of the LiDAR device 100 (e.g., depth images) to operate (e.g., a vehicle 2000 as shown in FIG. 11 that includes an ADAS 2100 implementing autonomous driving of the vehicle 2000 based on depth images generated based on operation of the LiDAR device 100 thereof), as the improved accuracy of measurement of distance information by the LiDAR device 100 may enable devices and/or systems that utilize outputs of the LiDAR device 100 to operate with improved accuracy regarding objects indicated by the distance information (e.g., depth images) generated by the LiDAR device 100. For example, a vehicle 2000 including the LiDAR device 100 and including an ADAS 2100 that utilizes depth images generated by the LiDAR device 100 to control driving (e.g., autonomous driving) of the vehicle 2000 may be configured to drive with improved accuracy and thus improved safety based on the LiDAR device 100 enabling the ADAS 2100 to determine the location and/or velocity of an object in the external environment in relation to the vehicle 2000 and thus to control driving of the vehicle 2000 in relation to the object with improved accuracy and/or precision.

Figure 7A:
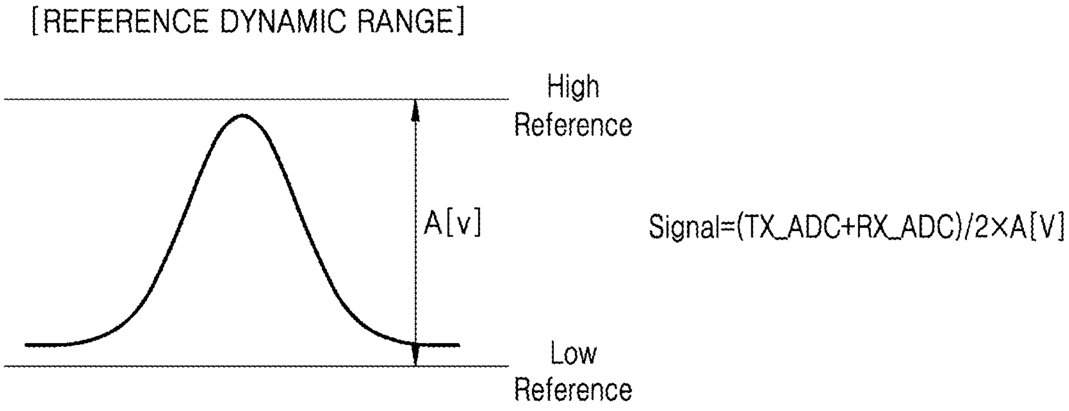
FIGS. 7A and 7B are diagrams for describing adjustment of a dynamic range of an analog-to-digital converter (ADC), according to some example embodiments.
Figure 7B:
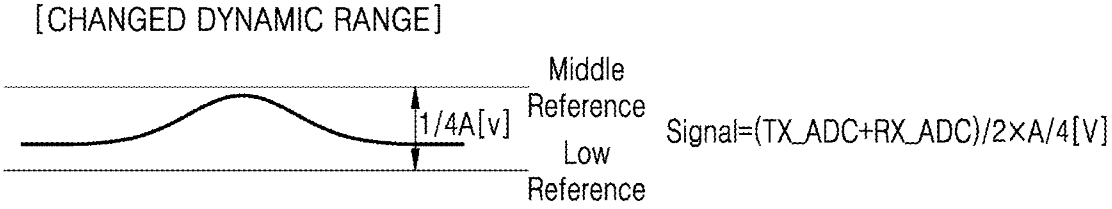

FIGS. 7A and 7B are diagrams for describing adjustment of a dynamic range of the ADC 510, according to some example embodiments.

Referring to FIG. 7A, a reference dynamic range of the ADC 510 is illustrated. The reference dynamic range is an initially set dynamic range of the ADC 510, and for example, may be a dynamic range having an amplitude level of A[V].

Referring to FIG. 7B, a dynamic range of the ADC 510, which adaptively varies for a pulsed laser reflected light signal of a low SNR, is illustrated. A changed dynamic range of FIG. 7B may be in a ¼ level of the reference dynamic range, i.e., ¼ A[V]. In some example embodiments of the present inventive concepts, the changed dynamic range is in the ¼ level of the reference dynamic range, but the changed dynamic range may be reduced to any level other than the ¼ level.

Meanwhile, according to the reference dynamic range of FIG. 7A, a pulse signal may be calculated according to "Signal=(TX_ADC+RX_ADC)/2*A[V]", and according to the changed dynamic range of FIG. 7B, a pulse signal of low SNR may be calculated according to "Signal=(TX_ADC+RX_ADC)/2*A/4[V]".

Figure 8:
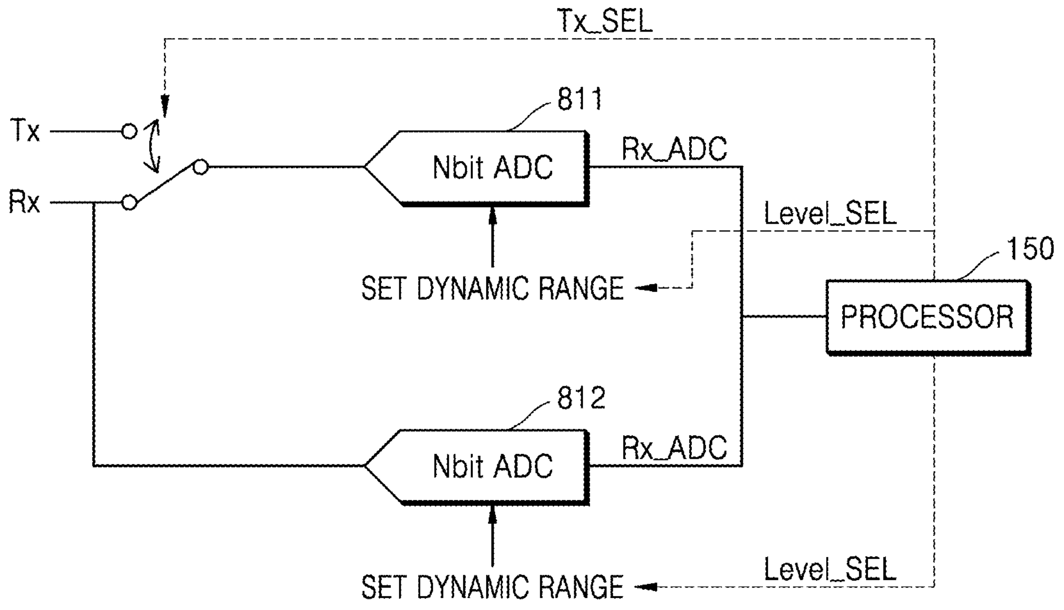
FIG. 8 is a diagram for describing operations of a first ADC and a second ADC included in a signal analyzer, according to some example embodiments.

FIG. 8 is a diagram for describing operations of a first ADC 811 and a second ADC 812 included in the signal analyzer 140, according to some example embodiments.

Referring to FIG. 8, the signal analyzer 140 described above may include the first ADC 811 performing analog-to-digital conversion on a pulsed laser light 110*a* irradiated from the laser light irradiator 110 of FIG. 1, and the second ADC 812 performing analog-to-digital conversion on a pulsed laser reflected light signal 120*a* received by the laser light receiver 120 of FIG. 1.

When the pulsed laser light 110*a* is irradiated to an object, the first ADC 811 performs analog-to-digital conversion on a first pulse of the irradiated pulsed laser light 110*a* to measure a reference time point at which the pulsed laser light is irradiated. Then, the first ADC 811 may be switched to be connected to a circuit Rx of the laser light receiver 120 so as to perform analog-to-digital conversion on the pulsed laser reflected light signal 120*a* received by the laser light receiver 120 (for example, pulse signals of the pulsed laser reflected light signal 120*a* after a second pulse signal thereof).

In other words, the first ADC 811 and the second ADC 812 may perform analog-to-digital conversion for 2-channel signal sampling from a second pulse of the pulsed laser reflected light signal 120*a* corresponding to a certain pixel. Accordingly, sampling data twice as much as that of 1-channel signal sampling may be obtained, and an SNR may be improved by 3 dB.

Figure 9:
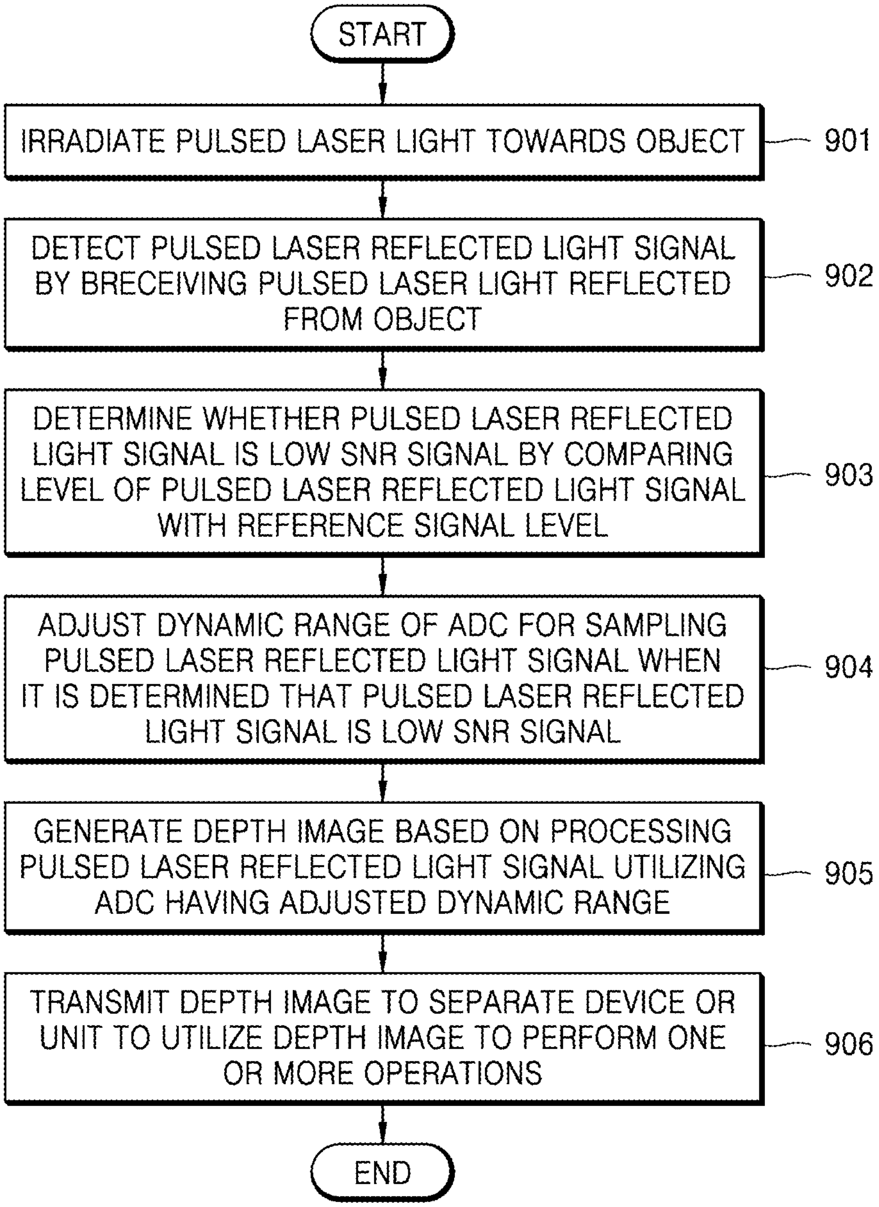
FIG. 9 is a flowchart of an operating method of a LiDAR device, according to some example embodiments.

FIG. 9 is a flowchart of an operating method of the LiDAR device 100, according to some example embodiments.

Referring to FIG. 9, the operating method of the LiDAR device 100 relates to the example embodiments described above with reference to the drawings, and thus details described above in the drawings may also be applied to the operating method of FIG. 9 even if omitted.

In operation 901, the laser light irradiator 110 irradiates a pulsed laser light 110*a* towards an object.

In operation 902, the laser light receiver 120 detects a pulsed laser reflected light signal 120*a* by receiving the pulsed laser light reflected from the object.

In operation 903, the signal analyzer 140 determines whether the pulsed laser reflected light signal is a low SNR signal by comparing a level of the pulsed laser reflected light signal 120*a* with a reference signal level. Here, to determine the low SNR signal, the signal analyzer 140 may compare a signal level (a digital value) obtained through analog-to-digital conversion using the ADC 510 of the signal analyzer 140 with the reference signal level or compare an analog voltage level using the comparator 520 of the signal analyzer 140 with the reference signal level.

In operation 904, when it is determined (e.g., in response to a determination) that the pulsed laser reflected light signal is the low SNR signal, the processor 150 adjusts a dynamic range of the ADC 510 for sampling (e.g., to cause the ADC 510 to sample) the pulsed laser reflected light signal from the low SNR signal. However, when it is determined (e.g., in response to a determination) that the pulsed laser reflected light signal is not the low SNR signal, the processor 150 may perform signal sampling using a reference dynamic range that is initially set, without adjusting the dynamic range of the ADC 510.

In operation 905, the LiDAR device 100 may generate a depth image of an objection OB based on the LiDAR device 100 detecting and processing a pulsed laser reflected light signal 120*a* using a at least the signal analyzer 140 with the ADC 510 having the adjusted or non-adjusted dynamic range.

In operation 906, the depth image is transmitted to a separate device or unit (e.g., an ADAS 2100 of a vehicle 2000) to cause the separate device or unit to utilize the depth image to perform one or more operations (e.g., the ADAS 2100 controls one or more drive control elements 2300 based on the depth image, for example based on using the depth image to detect an object OB in an environment external to the vehicle 2000 and controls the one or more drive control elements 2300 to drive the vehicle 2300 in relation to (e.g., around, to avoid, etc.) the detected object OB).

The method described above may be recorded on a non-transitory computer-readable recording medium having recorded thereon one or more programs including instructions for executing the method. Examples of the computer-readable recording medium include magnetic media such as hard disks, floppy disks, and magnetic tapes, optical media such as CD-ROMs and DVDs, magneto-optical media such as floptical disks, and hardware devices specially configured to store and perform program commands, such as read-only memory (ROM), random-access memory (RAM), and flash memory. Examples of the computer instruction include machine codes generated by a compiler, and high-level language codes executed by a computer by using an interpreter.

Figure 10:
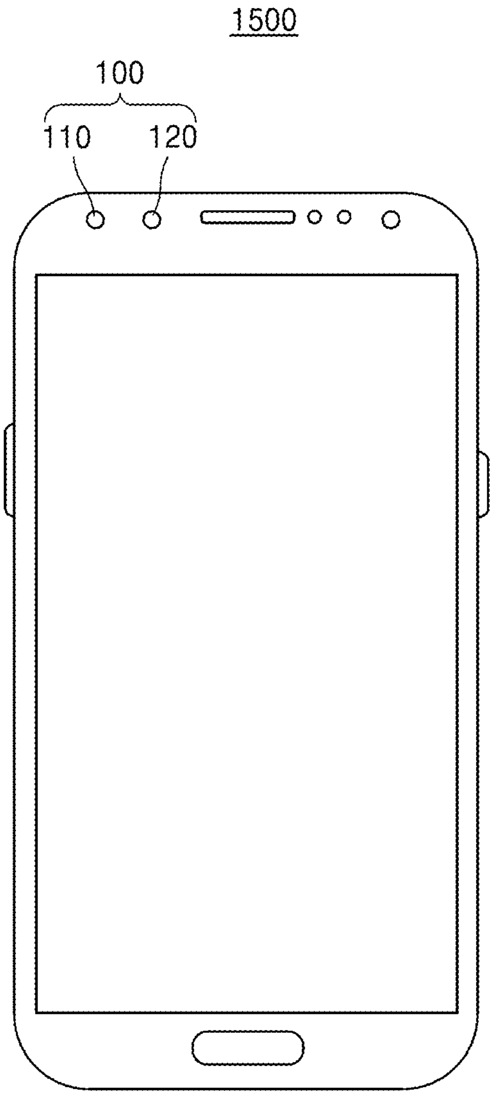
FIG. 10 is an example system including a LiDAR device according to some example embodiments.

FIG. 10 is an example system including a LiDAR device according to some example embodiments. The example semiconductor system illustrated in FIG. 10 is included in a smart phone 1500, which may extract depth information of objects in an image (e.g., generate a depth image of an object in an image captured by a camera of the smart phone, control out-focusing of an image, or automatically identify objects in an image by using the LiDAR device 100 that is an object 3D sensor.

Referring to FIG. 10, the smart phone 1500 may include the laser light irradiator 110 and the laser light receiver 120. The smart phone 1500 may be configured to a user with a laser beam using the laser light irradiator 110, and the laser light receiver 120 is configured to receive the laser beam reflected from the user, thereby scanning the user.

FIG. 11 is a block diagram illustrating a vehicle 2000 including a LiDAR device 100 according to some example embodiments.

As shown in FIG. 11, a LiDAR device 100 according to some example embodiments may be applied to (e.g., included in) a vehicle 2000. The vehicle 2000 may include one LiDAR device 100 or a plurality of LiDAR devices 100 disposed in various locations in the vehicle 2000. The vehicle 2000 may provide a driver with various pieces of information about the interior or the surroundings of the vehicle 2000 by using a LiDAR device 100 and may provide information used for autonomous driving based on automatically recognizing objects or people in the image. For example, referring to FIG. 11 the vehicle 2000 may include one or more LiDAR devices 100 according to any of the example embodiments. In some example embodiments, one or more LiDAR devices 100 may be included in one or more portions of a vehicle 2000. A LiDAR device 100 in the vehicle 2000 may generate a depth image of an object OB in an external environment that is external to the vehicle 2000 and transmit the depth image to other components of the vehicle 2000, such as an Advanced Driver Assistance System (ADAS) 2100 which may use the depth image to control one or more drive control elements 2300 of the vehicle 2000 to autonomous navigate (e.g., drive) the vehicle 2000 through the external environment.

The vehicle 2000 may include a vehicle that is configured to be driven ("navigated") manually (e.g., based on manual interaction with one or more driving instruments, or drive control elements 2300 of the vehicle 2000 by at least one occupant of the vehicle 2000), a vehicle that is configured to be driven ("navigated") autonomously (e.g., an autonomous vehicle configured to be driven based on at least partial computer system control of the vehicle 2000 with or without input from vehicle 2000 occupant(s)), some combination thereof, and/or the like. For example, in some example embodiments, the vehicle 2000 may be configured to be driven ("navigated") through an environment (also described herein interchangeably as an external environment that is external to the vehicle 2000) based on generation of data (e.g., a depth image) by one or more LiDAR devices 100 included in the vehicle 2000 based on the one or more LiDAR device 100 performing any of the functionality, operations, and/or methods according to any of the example embodiments. Such navigation may include the vehicle 2000 being configured to navigate through an environment, in relation to an object located in the environment, based on data (e.g., a depth image) generated by the LiDAR device 100 as a result of the LiDAR device 100 emitting a pulsed laser light 110*a* into the environment and detecting the object OB in the environment, where the LiDAR device 100 may detect the object OB based on detecting a reflection and/or scattering of the emitted laser beam off of the object OB based on receiving and thus detecting a pulsed laser reflected light signal 120*a* reflected from the object OB.

Referring to FIG. 11, the vehicle 2000 may include one or more driving instruments, also referred to herein as drive control elements 2300 (e.g., throttle control devices, steering control devices, braking control devices), or the like that may be controlled to control navigation (e.g., driving) of a vehicle 2000 through an external environment (e.g., along a road). The vehicle 2000 may include an Advanced Driver Assistance System (ADAS) 2100 that is configured to control one or more driving instruments (e.g., drive control elements 2300) of the vehicle 2000 to at least partially implement autonomous navigation (e.g., autonomous driving) of the vehicle 2000 through the external environment. As shown, the ADAS 2100 may include a processor 2102 and a memory 2104. The vehicle 2000 may further include one or more interfaces 2200. The one or more interfaces 2200 may include for example one or more display interfaces, touchscreen display interfaces, buttons, keypads, or the like via which a user, driver, passenger, or the like within the vehicle 2000 may interact with one or more elements of the vehicle 2000, including the ADAS 2100 and/or one or more drive control elements 2300. The one or more interfaces 2200 may include for example one or more communication interfaces (e.g., a wireless network communication interface, antenna, transceiver, or the like) via which a remote user, device, or the like may interact with one or more elements of the vehicle 2000, including the ADAS 2100 and/or one or more drive control elements 2300.

The memory 2104 stores instructions executable by the processor 2102, and the processor 2102 is configured to execute the instructions to cause the ADAS 2100 to obtain, from the vehicle 2000 (e.g., from LiDAR device 100), a depth image of an environment and/or an object OB included in the environment, for example a depth image generated by the LiDAR device 100 while the vehicle 2000 is driving along a road, to detect the object OB in the depth image, and to mark the detected object OB with a bounding box and to control one or more drive control elements 2300 based on the detected object OB, for example to cause the vehicle 2000 to drive to avoid the detected object OB in the environment.

The ADAS 2100 may be included in, may include, and/or may be implemented by, one or more instances of processing circuitry (e.g., processor 2102) such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the processing circuitry may include a non-transitory computer readable storage device (e.g., memory 2104), for example a solid-state drive (SSD), storing a program of instructions, and a processor configured to execute the program of instructions to implement the functionality of the ADAS 2100.

Any of the systems, devices, circuits, processors, modules, controllers, any portion thereof, or the like (e.g., LiDAR device 100, laser light irradiator 110, laser light receiver 120, amplifier 130, signal analyzer 140, processor 150, ADC 510, comparator 520, TDC 530, first ADC 811, second ADC 812, smart phone 1500, vehicle 2000, ADAS 2100, processor 2102, memory 2104, interfaces 2200, drive control elements 2300, any portion thereof, or the like) may be included in, may include, and/or may be implemented by, one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the processing circuitry may include a non-transitory computer readable storage device, for example a solid state drive (SSD), storing a program of instructions, and a processor configured to execute the program of instructions to implement the functionality of any of the systems, devices, circuits, processors, modules, controllers, any portion thereof, or the like.

It should be understood that example embodiments described herein should be considered in a descriptive sense only and not for purposes of limitation. Descriptions of features or aspects within each example embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims.

What is claimed is:

1. A light detection and ranging (LiDAR) device, comprising:

- a laser light irradiator configured to irradiate a pulsed laser light towards an object as irradiated pulsed laser light;
- a laser light receiver configured to detect a pulsed laser reflected light signal based on receiving the pulsed laser light reflected from the object;
- a signal analyzer configured to determine whether the pulsed laser reflected light signal is a low signal to noise ratio (SNR) signal based on comparing a level of the pulsed laser reflected light signal with a reference signal level, wherein the signal analyzer includes,
  - a first ADC configured to perform analog-to-digital conversion on a first pulse of the irradiated pulsed laser light that is irradiated from the laser light irradiator, and
  - a second ADC different from the first ADC, the second ADC configured to perform analog-to-digital conversion on the pulsed laser reflected light signal detected by the laser light receiver,
  - wherein the first ADC and the second ADC are each configured to perform analog-to-digital conversion for 2-channel signal sampling from a second pulse of the pulsed laser reflected light signal corresponding to a certain pixel; and
- a processor configured to, in response to a determination that the pulsed laser reflected light signal is the low SNR signal, adjust a dynamic range of an analog-to-digital converter (ADC) to sample the pulsed laser reflected light signal,
- wherein the processor is further configured to, in response to the determination that the pulsed laser reflected light signal is the low SNR signal, adjust the dynamic range of the ADC to an adjusted dynamic range such that the adjusted dynamic range is smaller than a reference dynamic range, and
- wherein the processor is further configured to switch the first ADC between performing analog-to-digital conversion on the first pulse of the irradiated pulsed laser light and performing analog-to-digital conversion on the second pulse of the pulsed laser reflected light signal.

2. The LiDAR device of claim 1, wherein the adjusted dynamic range is such that the ADC detects the pulsed laser reflected light signal as a valid signal when the pulsed laser reflected light signal is determined to be the low SNR signal.

3. The LiDAR device of claim 2, wherein the adjusted dynamic range is ¼ of the reference dynamic range of the ADC.

4. The LiDAR device of claim 2, wherein the ADC is configured to perform signal sampling with a rate of 4 times per second on the pulsed laser reflected light signal determined to be the low SNR signal.

5. The LiDAR device of claim 1, wherein the signal analyzer is further configured to:

- compare a level of one pulse from among a plurality of pulses of the pulsed laser reflected light signal corresponding to the certain pixel with the reference signal level, and
- in response to a determination that the level of the first pulse is lower than the reference signal level, determine that the pulsed laser reflected light signal corresponding to the certain pixel is the low SNR signal.

6. The LiDAR device of claim 5, wherein the ADC is further configured to perform, in response to a determination that the pulsed laser reflected light signal corresponding to the certain pixel is the low SNR signal, signal sampling using the adjusted dynamic range from another pulse from among the plurality of pulses.

7. The LiDAR device of claim 6, wherein the processor is further configured to,

- in response to a determination that the signal sampling using the adjusted dynamic range is completed for the plurality of pulses, restore the adjusted dynamic range to the reference dynamic range of the ADC.

8. The LiDAR device of claim 1, wherein the pulsed laser light is irradiated and the pulsed laser reflected light signal is detected in units of one pixel of an image of the object.

9. The LiDAR device of claim 1, wherein the processor is further configured to calculate a distance to the object, based on a time of flight (ToF) from the LiDAR device to the object, the ToF being measured based on detecting the pulsed laser reflected light signal.

10. An operating method of a light detection and ranging (LiDAR) device, the operating method comprising:

- irradiating, by a laser light irradiator, a pulsed laser light towards an object as irradiated pulsed laser light;
- detecting, by a laser light receiver, a pulsed laser reflected light signal based on receiving the pulsed laser light reflected from the object;
  - determining, by a signal analyzer, whether the pulsed laser reflected light signal is a low signal to noise ratio (SNR) signal based on comparing a level of the pulsed laser reflected light signal with a reference signal level, wherein the signal analyzer includes a first ADC configured to perform analog-to-digital conversion on a first pulse of the irradiated pulsed laser light that is irradiated from the laser light irradiator, and a second ADC different from the first ADC, the second ADC configured to perform analog-to-digital conversion on the pulsed laser reflected light signal detected by the laser light receiver, wherein the first ADC and the second ADC are each configured to perform analog-to-digital conversion for 2-channel signal sampling from a second pulse of the pulsed laser reflected light signal corresponding to a certain pixel; and adjusting, by a processor in response to a determination that the pulsed laser reflected light signal is the low SNR signal, a dynamic range of an analog-to-digital converter (ADC) to sample the pulsed laser reflected light signal, wherein the adjusting comprises, in response to the determination that the pulsed laser reflected light signal is the low SNR signal, adjusting the dynamic range of the ADC such that an adjusted dynamic range is smaller than a reference dynamic range, and wherein the adjusting further includes switching the first ADC between performing analog-to-digital conversion on the first pulse of the irradiated pulsed laser light and performing analog-to-digital conversion on the second pulse of the pulsed laser reflected light signal.

11. The operating method of claim 10, wherein the adjusted dynamic range is such that the ADC detects the pulsed laser reflected light signal as a valid signal when the pulsed laser reflected light signal is determined to be the low SNR signal.

12. The operating method of claim 11, wherein the adjusted dynamic range is ¼ of the reference dynamic range of the ADC.

13. The operating method of claim 11, wherein the ADC is configured to perform signal sampling with a rate of 4 times per second on the pulsed laser reflected light signal determined to be the low SNR signal.

14. The operating method of claim 10, wherein the determining comprises:

comparing a level of one pulse from among a plurality of pulses of the pulsed laser reflected light signal corresponding to the certain pixel with the reference signal level; and in response to a determination that the level of the one pulse is lower than the reference signal level, determining that the pulsed laser reflected light signal corresponding to the certain pixel is the low SNR signal.

15. The operating method of claim 14, further comprising, in response to a determination that the pulsed laser reflected light signal corresponding to the certain pixel is the low SNR signal, performing, by the ADC, signal sampling using the adjusted dynamic range from another pulse from among the plurality of pulses.

16. The operating method of claim 15, further comprising:

in response to a determination that the signal sampling using the adjusted dynamic range is completed for the plurality of pulses, restoring the adjusted dynamic range to the reference dynamic range.

17. The operating method of claim 10, wherein the pulsed laser light is irradiated and the pulsed laser reflected light signal is detected in units of one pixel of an image of the object.

18. The operating method of claim 10, further comprising calculating a distance to the object, based on a time of flight (ToF) from the LiDAR device to the object, the ToF being measured based on detecting the pulsed laser reflected light signal.

19. A non-transitory computer-readable recording medium having recorded thereon a program for executing, on a computer, the operating method of claim 10.

* * * * *